INVENTORS
Louis P. Garvey,
John G. Haviland, &
BY Hugh R. Brand
Paul Fitzpatrick
ATTORNEY

2,892,657

GLASS RUN CHANNEL

Hugh R. Brand and Louis P. Garvey, Detroit, and John G. Haviland, Pontiac, Mich., assignors to General Motors Corporation, Detroit, Mich., a corporation of Delaware Application December 23, 1954, Serial No. 477,211

17 Claims. (Cl. 296—44.5)

This invention relates to a glass run channel and more particularly to a glass run channel having a coating or covering of fluorinated ethylene polymeric material on the yielding material lining the channel.

In present glass run channels, the yielding material lining the channel is usually felt, mohair, or hairpile secured to a fabric backing or a backing of the same material. This lining may be continuous or may be in the form of cushioning strips located on the sides and bottom of the channel for yieldingly engaging the window glass around the window opening.

Felt or hairpile lining has a tendency to swell when wet, and this may cause the lining to exert considerable pressure on the window glass making it difficult or impossible to move the glass. These materials also exhibit a very high increase in their coefficients of friction when wet. Felt, hairpile, or mohair also absorb and hold substantial amounts of moisture for periods of time, which frequently has resulted in failure of the metal backing channel by corrosion. There is also the problem of wind noise caused by air flowing through the felt, hairpile, or mohair around the window glass.

This invention solves the problems of swelling of the felt or hairpile lining, corrosion of the backing channel, and wind noise by having a coating or covering of fluorinated ethylene polymeric material on the yielding material lining the channel. These polymeric materials, such as polytetrafluroethylene, commercially known as Teflon, or polytrifluoromonochloroethylene, commercially known as Trithene or Kel-F, are impervious to moisture and air and possess low coefficients of friction when wet or dry which makes them excellent materials for use in glass run channels. Polytetrafluoroethylene also has peculiar lubricating qualities due to its paraffin-like surface characteristic.

In the specific embodiments of this invention, the metal backing channel is lined with yielding material, such as felt or mohair secured to a fabric backing to form a yielding channel. A covering of fluorinated ethylene polymeric material or a covering of glass cloth coated with this material is then cemented or stitched to the yielding material. This impervious covering prevents swelling of the yielding material, corrosion of the backing channel and wind noise and also has a low coefficient of friction to permit easy window movement. The subject matter of this invention is related to our application S.N. 477,212 for Glass Run Channel filed December 23, 1954, and S.N. 477,213 for Glass Run Channel filed December 23, 1954.

An object of this invention is to provide a glass run channel permitting easy window glass movement regardless of ambient conditions. Another object of this invention is to provide a glass run channel materially reducing wind noise around a window glass fitting within the channel. A more specific object of this invention is to provide a glass run channel having a facing of impervious material possessing a low coefficient of friction in contact with the window glass.

These and other objects of this invention will be readily apparent from the following specification and drawings, in which.

Figure 1:
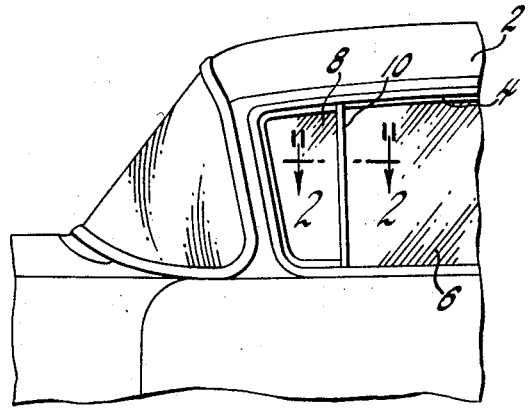
Figure 1 is a partial view of an automobile having the glass run channel of this invention mounted thereon.

Referring now to the drawings, Figure 1 shows an automobile 2 having a window opening 4, a slidable window 6 and a ventipane window 8 closing the rear and forward portions of the window opening, and a division post channel 10 between the slidable and ventipane windows. The slidable window 6 mounted within the door well by suitable window regulator mechanism moves vertically between open and closed positions, and the ventipane window 8 is pivotally mounted within the forward part of the window opening. The rear portion of the window opening and the division post channel mount glass run channels to guide and to seal the slidable window within the window opening in closed or partially closed position.

Figure 2:
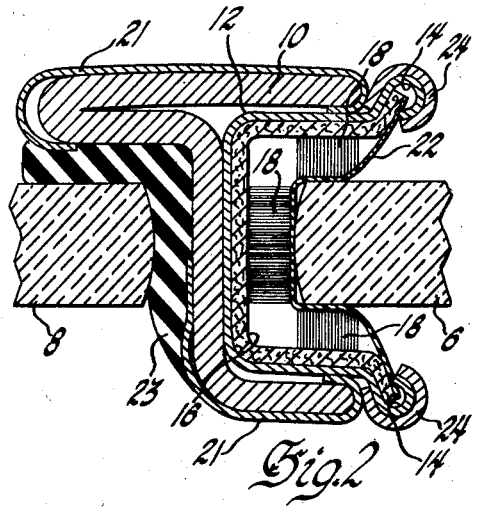
Figure 2 is a view on the plane indicated by line 2—2 of Figure 1 showing one embodiment of this invention.

Referring now to Figure 2 of the drawings, one embodiment of the glass run channel is shown. The backing channel 12 mounted within the rear portion of the window opening and division post channel has beaded edges 14 and is usually made of metal to provide a rigid backing for the glass run channel. A cloth base of fabric backing 16 secured to the inner surface of channel 12 by a suitable cement has its edges terminating within the beaded edges 14 of channel 12. Cushioning strips 18 of felt or mohair cemented to the cloth base along the bottom and sides of the backing channel form a yielding channel within the rigid backing channel to guide and seal window glass 6 within the window opening.

The felt or mohair cushioning strips absorb substantial amounts of moisture and retain this moisture for considerable periods of time which frequently leads to corrosion of the backing channel 12. In addition, felt has a tendency to swell when wet which causes the cushioning strips to exert considerable pressure against the window glass 6 and make it difficult or impossible to move the glass in the channel. There is also the problem of wind noise caused by the flow of air through the cushioning strips 18 around the window glass.

These problems are solved by providing an impervious covering 22 for the cushioning strips. The covering 22 is made of glass cloth coated on one surface with either polytetrafluoroethylene or polytrifluoromonochloroethylene. The coated surface of covering 22 engages window glass 6 in the areas of contact between the window glass and the yielding channel formed by the cushioning strips and the glass cloth surface of the covering is cemented to the cushioning strips. The covering terminates within the open beaded edges 14 of the backing channel on top of the fabric backing 16. Decorative beads 24 of chrome plated metal or stainless steel are fitted over the beaded edges 14 of the backing channel 12 and then the beads and the beaded edges are crimped together to secure the edges of the cloth base or fabric backing 16 and covering 22 within the beaded edges 14.

Covering 22 is impervious and thus seals the cushioning strips against moisture to prevent swelling of these strips and corrosion of channel 12, and materially reduces wind noise since the wind cannot penetrate the covering to flow through the cushioning strips around the window glass. Polytetrafluoroethylene and polytrifluoromonochloroethylene have low coefficients of friction and polytetrafluoroethylene also has peculiar lubricating properties due to its paraffin-like surface characteristic and, therefore, window glass 6 is easily slidable within the glass run channel. Decorative scalp moldings 21 enhance the appearance of the division post channel and a weather strip 23 is provided for the ventipane window 8.

Figure 3:
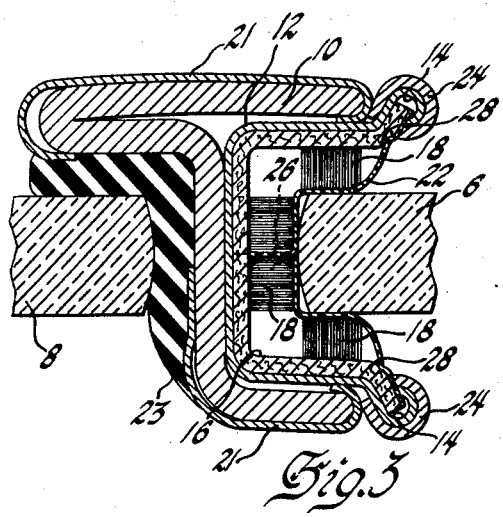
Figure 3 is a view similar to Figure 2 showing another embodiment of this invention.

Figure 3 of the drawings shows another embodiment of the invention and like numerals will be used for like parts. The covering 22 is glass fibre coated on one surface with either polytetrafluoroethylene or polytrifluoromonochloroethylene and is stitched to the fabric backing or cloth base 16 at 26 through one of the cushioning strips 18 and at 28 to one side of the other cushioning strips 18. The edges of the fabric backing and the covering are secured within the beaded edges 14 of the backing channel 12 by crimping over these edges and beaded edges 24 as in Figure 2.

Figure 4:
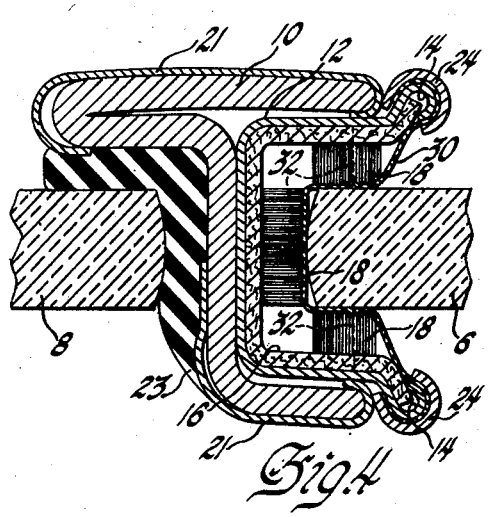
Figure 4 is a view similar to Figure 2 showing a further embodiment of this invention.

Referring now to Figure 4 of the drawings, another embodiment of the invention is shown with the metal backing channel 12 assembled within the division post channel 10 and like numerals will be used for like parts. In this form of the invention the covering 30 is a sheet of either polytetrafluoroethylene or polytrifluoromonochloroethylene stitched to the cushioning strips 18 and the fabric backing or cloth base 16 at 32. The covering 30 extends over the outer surface of beaded edges 14 and decorative beads 24 and beaded edges 14 of the backing channel are crimped together to securely hold the edges of the covering 30 between these members, and to securely hold the edges of the fabric backing or cloth base 16 within beaded edges 14.

Figure 5:
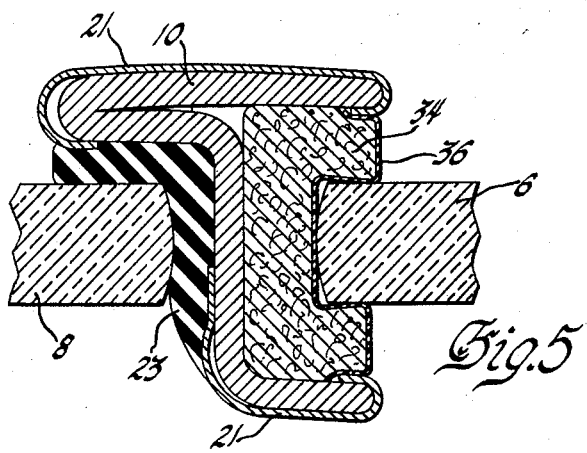
Figure 5 is a view similar to Figure 2 showing still another embodiment of this invention.

In Figure 5 of the drawings, another embodiment of the invention is shown which eliminates the metal backing channel. A formed channel 34 of felt cemented within the division post channel has a covering 36 of either polytetrafluoroethylene or polytrifluoromonochloroethylene. The covering 36 extends partially over the outside surface of the felt channel 34 to hide the edges of the covering from view and provide additional sealing, and is secured to the channel by suitable cements such as oil soluble elastomer compounds. If desired, covering 36 may be glass cloth coated on one surface with either of the above resins as in Figures 2 and 3, and then the glass fibre surface of the covering may be cemented to the formed channel 34 of felt. This embodiment of the invention may be used solely on the division post channel and the other embodiments of the invention used in the rear portion of the window opening.

Thus, this invention provides a glass run channel having a covering of fluorinated ethylene polymeric material on the yielding material lining the glass run channel. This covering is impervious to moisture and air to prevent swelling of the yielding material, corrosion of the backing channel, and wind noise, and also has a low coefficient of friction in contact with the window glass. The glass run channel of this invention thus offers several unique and distinct advantages over presently used glass run channels wherein the yielding channel formed by the material lining the glass run channel is directly in contact with the sliding window glass. Although the invention has been shown and described in conjunction with an automobile, it is obvious that it has other uses wherein similar problems arise in conjunction with the use of sliding window glasses and glass run channels.

In the following claims the term "fluorinated ethylene polymeric material" is used, and this term is intended to cover only materials which are polymers of a fluoroethylene. Examples of such polymers are polytetrafluoroethylene and polytrifluoromonochloroethylene.

Although specific embodiments of this invention have been shown and described, various changes and modifications may be made within the scope and spirit of the invention.

We claim:

1. A glass run channel comprising a backing channel, yielding material lining said channel, and a layer of fluorinated ethylene polymeric material on said yielding material.

2. A glass run channel comprising a backing channel, a channel of yielding material within said channel, and a covering of fluorinated ethylene polymeric material on said yielding material.

3. A glass run channel comprising a backing channel, yielding material lining said channel, and a layer of fluorinated ethylene polymeric material covering said yielding material and secured to said channel.

4. A glass run channel comprising a backing channel, yielding material lining said channel, and a layer of fluorinated ethylene polymeric material secured to said yielding material and said channel.

5. A glass run channel comprising a backing channel having beaded edges, yielding material lining said channel, and a layer of fluorinated ethylene polymeric material on said yielding material secured to said beaded edges.

6. A glass run channel comprising a backing channel having reentrant flanged portions, yielding material lining said channel, and a covering of fluorinated ethylene polymeric material secured to said yielding material and terminating within said reentrant flanged portions.

7. A glass run channel comprising a backing channel having open beaded side edges, a fabric lining cemented to said channel and terminating within said beaded edges, cushioning strips of yielding material cemented to said lining along the bottom and sides of said channel to form a yielding channel, and a covering of glass cloth coated with fluorinated ethylene polymeric material secured to said cushioning strips and terminating within said beaded edges, the terminal edges of said lining and said covering being secured to said channel by crimping over said beaded edges.

8. A glass run channel comprising a backing channel having open beaded side edges, a fabric lining for said channel terminating within said beaded edges, cushioning strips of yielding material cemented to said lining along the bottom and sides of said channel to form a yielding channel, and a covering of glass cloth coated with fluorinated ethylene polymeric material terminating within said beaded edges, said covering and lining being stitched together adjacent said beaded edges and being stitched to said bottom cushioning strip, the terminal edges of said lining and said covering being secured to said channel by crimping over said beaded edges.

9. A glass run channel comprising a backing channel and a channel of yielding material cemented within said channel, said channel of yielding material being coated with fluorinated ethylene polymeric material on its inner surfaces and a portion of its outer side surfaces.

10. A glass run channel comprising a backing channel having open beaded edges, a fabric lining for said channel terminating within said beaded edges, cushioning strips of yielding material cemented to said lining along the bottom and sides of said channel to form a yielding channel, and a covering of fluorinated ethylene polymeric material extending partially around said beaded edges, said covering being secured to said channel by open beaded members crimped over said beaded edges of said channel.

11. A glass run channel comprising a backing channel having reentrant flanged portions, yielding material lining said channel, a covering of fluorinated ethylene polymeric material secured to said yielding material and extending around said reentrant flanged portions, and means for securing said polymeric material to said flanged portions.

12. A glass run channel comprising a backing channel, a yielding material including cushioning strips lining said channel, and a covering of fluorinated ethylene polymeric material secured to said cushioning strips.

13. The combination comprising a slidable window and a window channel for said window including yielding means mounted within said channel having a facing of fluorinated ethylene polymeric material engaging said window.

14. The combination comprising a slidable window and a guiding channel for said window having a lining of yielding material and a covering of fluorinated ethylene polymeric material supported by said yielding material and engaging said window.

15. The combination comprising a slidable window and a window channel for said window having a channel shaped covering of fluorinated polymeric material yieldingly supported within said channel and engaging said window.

16. The combination comprising a slidable window and a window channel for said window having a lining of yielding material and fluorinated ethylene polymeric material secured to said yielding material in the areas of contact between said material and said window.

17. A window channel run comprising a length of a metal strip having a U-shaped cross-section lined with a material comprising a bulky resilient layer having adhered to one side thereof a glass fabric and an exposed layer of a polymer of fluorinated ethylene adhered to the glass fabric.

References Cited in the file of this patent

UNITED STATES PATENTS

| | | |
|---|---|---|
| 1,918,444 | Bailey | July 18, 1933 |
| 2,020,103 | Calcutt | Nov. 5, 1935 |
| 2,446,516 | Bailey | Aug. 10, 1948 |
| 2,594,717 | Bailey | Apr. 29, 1952 |
| 2,606,059 | Wernig | Aug. 5, 1952 |
| 2,758,871 | Gray | Aug. 14, 1956 |

OTHER REFERENCES

Periodical: The Chemical Age, Jan. 1, 1949, pp. 10–14, article on Polytetrafluoroethylene.

Brochure: Du Pont "Teflon Tape" for electrical insulation, pp. 2, 3 and 5 only.

Brochure: Facts you should know about "Kel-F," 4 pp.